June 22, 1926.
C. A. HERLE
VEHICLE
Filed Oct. 14, 1922
1,589,965
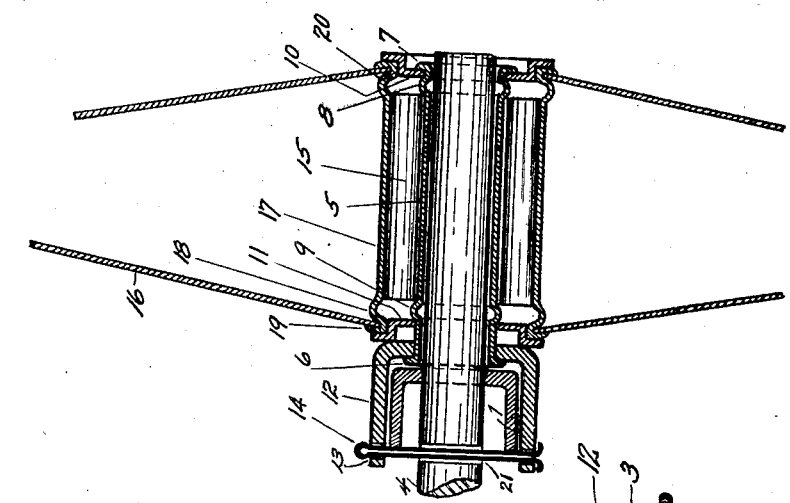
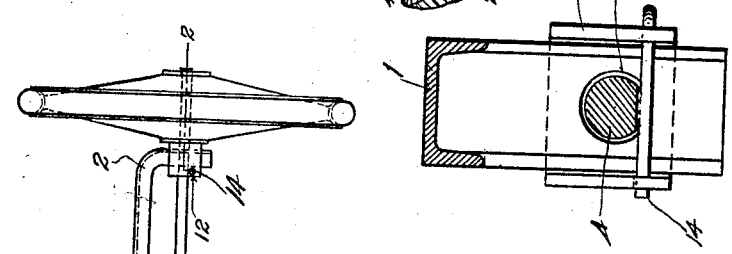
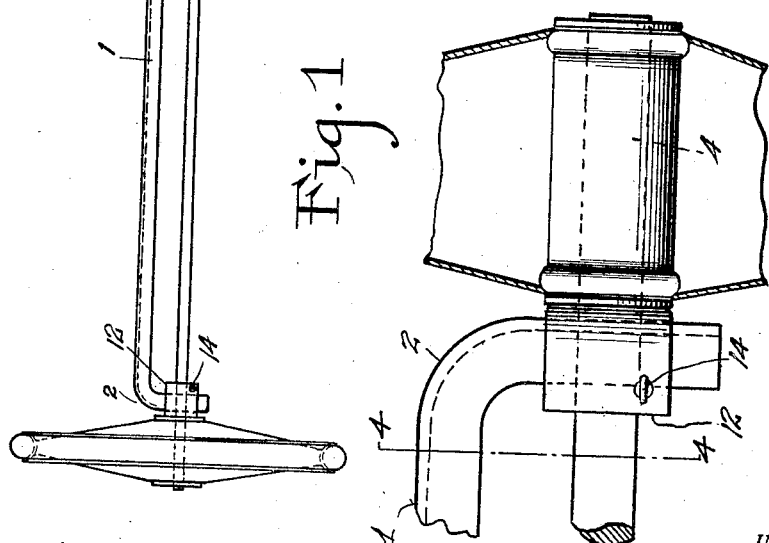
INVENTOR.
Chester A. Herle
BY
Davis & Simms
his ATTORNEYS.

Patented June 22, 1926.

1,589,965

UNITED STATES PATENT OFFICE.

CHESTER A. HERLE, OF ROCHESTER, NEW YORK.

VEHICLE.

Application filed October 14, 1922. Serial No. 594,629.

The present invention relates to vehicles and an object thereof is to provide an improved construction in which the wheel is mounted upon a bearing sleeve surrounding an axle and held to the axle by a detachable connection with the support for the axle. Another object of the invention is to provide an improved axle support which will be inexpensive to manufacture and durable in use. A further object of the invention is to provide an improved means for securing a bearing sleeve on an axle. Still another object of the invention is to provide a bearing sleeve with hub caps connected thereto in a novel manner. Still another and further object of the invention is to provide a bearing sleeve adapted to support an annular series of rollers and constructed so as to space the rollers from the hub caps.

To these and other ends, the invention consists of certain parts and combinations, all of which will be hereinafter described, the novel features being pointed out in the appended claims.

In the drawings:

Fig. 1 is a view showing in elevation a portion of a vehicle constructed in accordance with this invention;

Fig. 2 is an enlarged section on the line 2—2, Fig. 1;

Fig. 3 is a detail view of one end of the support and the axle; and

Fig. 4 is a section on the line 4—4, Fig. 3.

Referring more particularly to the illustrated embodiment of the invention, 1 indicates a supporting member which is in the form of a channel iron in inverted position with its ends 2 turned downwardly and provided with perforations 3 through which the axle 4 extends.

The axle 4 has bearing sleeves 5 supported on opposite ends thereof beyond the downwardly turned portions 2, these bearing sleeves being in the form of open ended tubes, each, in this instance, having outwardly turned portions 6 and 7 at opposite ends thereof and also each having between its ends, two annular ribs 8 and 9 formed by pressing the metal outwardly. The annular rib 8 is situated in close proximity to the outwardly turned portion 7 and secures a hub cap 10 rigidly to the bearing sleeve 5, while between the annular rib 9 and the outwardly turned portion 6 a hub cap 11 is arranged. Also supported between the annular rib 9 and the outwardly turned portion 6 is a retaining device for the bearing sleeve 5, this retaining device, in this instance, being in the form of a U shaped member 12, the connecting portion of which is provided with an opening through which the sleeve 5 extends, this connecting portion being situated between the annular rib 9 and the outwardly turned portion 6 so that the rib 9 and the portion 6 serve to hold both the retaining device and the hub cap 11. The arms of the U shaped retaining device 12 are adapted to lie on opposite sides of the depending portion 2 on the support 1 when the bearing sleeve 5 is fitted to an end of the axle 4. A cotter pin 14 passes through the openings 13 and also through a notch 21 in the axle 4, thereby performing the functions of holding the axle against longitudinal movement in the support 1, and against turning movement in said support and also holding the sleeve 5 to the downwardly turned end 2 of the support.

The annular ribs 8 and 9 also serve as abutments for roller bearings 15 which are arranged in an annular series about the sleeve 5. The wheel 16 is, in this instance, formed from two concavo-convex disks secured at their centers by a hub sleeve 17, which is provided with annular ribs 18, cooperating with the inner faces of the disks and outwardly turned flanges 19 cooperating with the outer faces of the disks. This sleeve fits about the annular shoulders 20 formed on the opposite faces of the hub caps 10 and 11, the length of the sleeve being substantially equal to the distance between the flange portions of the caps. The bearing of the sleeve, however, is upon the annular series of rollers 5, the hub caps 10 and 11 merely projecting loosely into the ends of the hub so as to exclude dust from the roller bearings.

From the foregoing it will be seen that there has been provided a novel and durable support connected to the axle in a novel manner and adapted to support the body of the vehicle. Removable bearing sleeves are secured on the axle in a novel manner. These bearing sleeves also have annular ribs which serve to limit the longitudinal movement of the bearing rollers and also cooperate with hub caps for the purpose of preventing movement of the caps toward the bearing rollers. The ends of the bearing sleeves are flared outwardly for confining parts between the annular ribs and said outwardly turned portions. The wheel has a hub sleeve which is closed at its ends by the caps and also has bearing upon the annular series of rollers. This invention is particularly adapted for use in a children's vehicle as it provides a durable construction which may be inexpensively manufactured.

What I claim as my invention and desire to secure by Letters Patent is:

1. In combination with a support, a shaft extending through said support, a bearing sleeve fitted on said shaft, two arms lying on opposite sides of the support and connected with the sleeve, and a pin passing through said arms on the inner side of the support and interlocking with said shaft.

2. In combination with a support, a shaft extending through said support, a sleeve fitted on said shaft, a member carried by the sleeve and provided with two arms arranged on opposite sides of the support, and means connected to the arms on the inner side of the support to hold the bearing sleeve to the axle.

3. In combination with a support, an axle projecting beyond the support, a bearing sleeve surrounding the axle and provided with an annular rib and having an outwardly turned portion at its inner end spaced from the said rib, a hub cap fitted on the sleeve between the rib and the said outwardly turned portion and a retaining member secured to the support and also arranged on the bearing sleeve and located between the rib and the outwardly extending portion of the sleeve, said rib and outwardly extending portion securing both the hub cap and the retaining member on the end of the bearing sleeve.

CHESTER A. HERLE.